Jan. 20, 1953 J. L. THOMPSON 2,626,180
AUTOMOTIVE VEHICLE BODY CONSTRUCTION
Filed July 5, 1950 2 SHEETS—SHEET 1
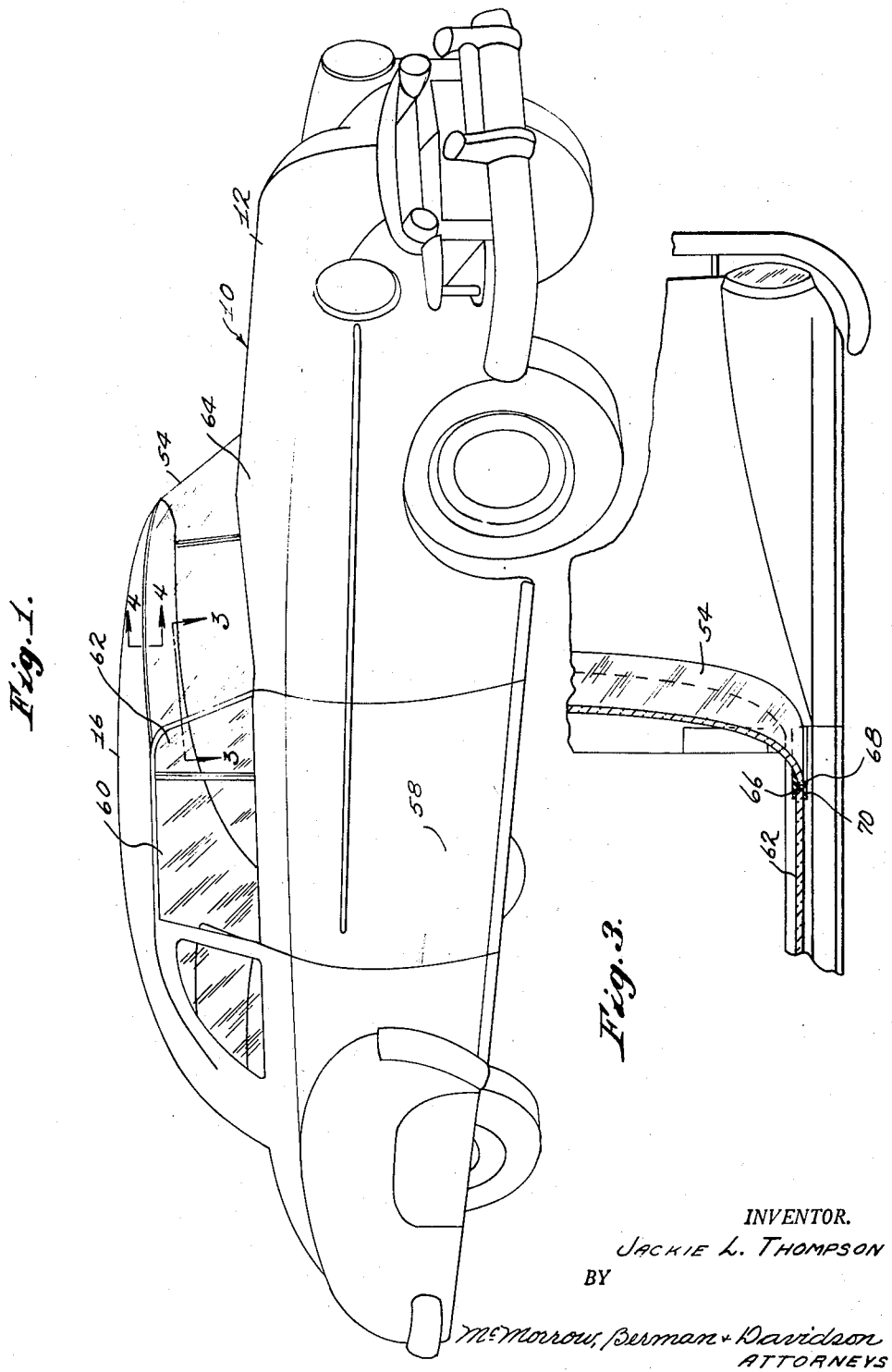
INVENTOR.
JACKIE L. THOMPSON
BY
McMorrow, Berman & Davidson
ATTORNEYS

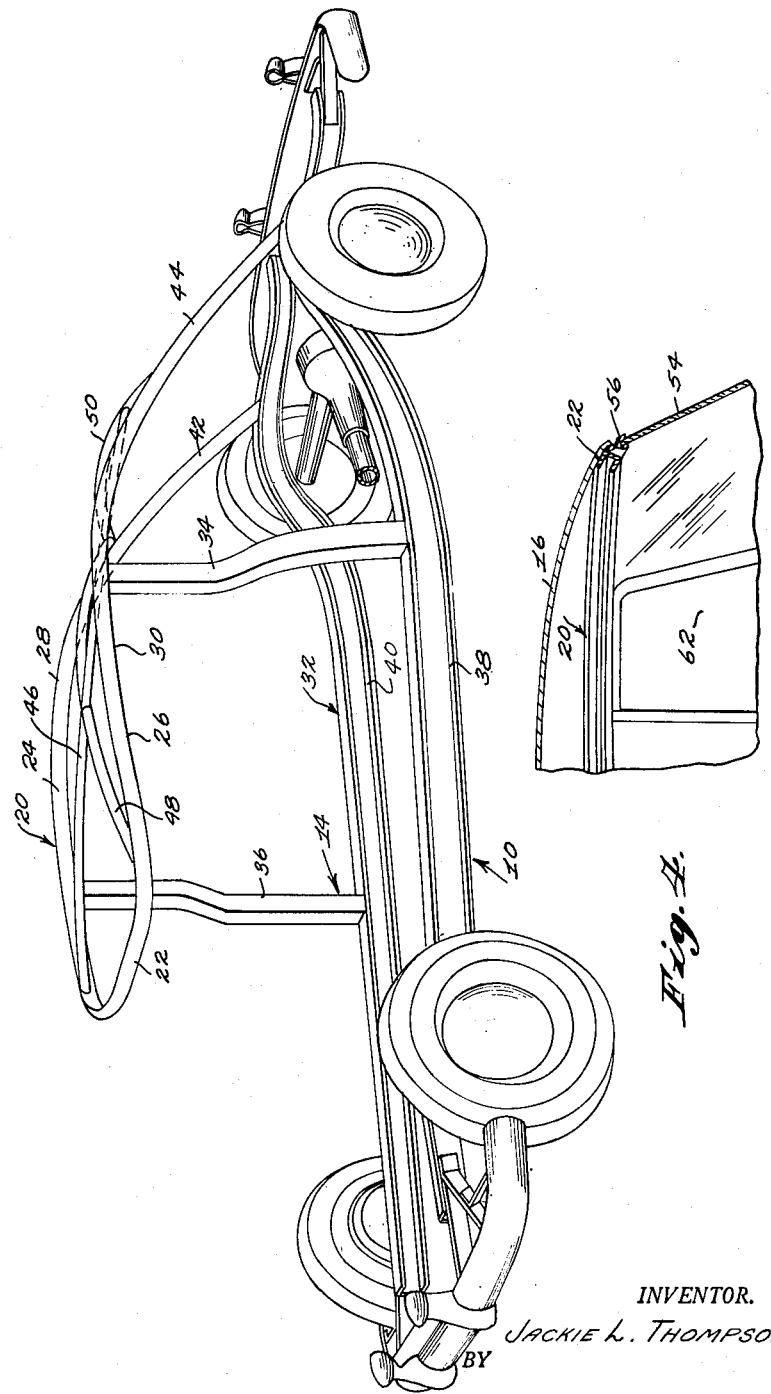

Patented Jan. 20, 1953

2,626,180

UNITED STATES PATENT OFFICE 2,626,180

AUTOMOTIVE VEHICLE BODY CONSTRUCTION

Jackie L. Thompson, Union, W. Va.

Application July 5, 1950, Serial No. 172,029

2 Claims. (Cl. 296—28)

This invention appertains to improvements in the design and construction of automotive vehicle bodies and has for its primary object to eliminate visual obstructions within the windshield area by eliminating structural connections between the roof and the chassis at the front of the roof.

Another important object of this invention is to strengthen the body along the roof and upper portions of the sides by providing a braced roof skeleton or frame mounted on the chassis in an inexpensive manner and in a manner to avoid interference with other body features.

These and ancillary objects and structural features of merit are attained by this invention, the preferred embodiment of which is set forth in the following description and illustrated in the accompanying drawings, wherein:

Figure 1 is a perspective view of a closed automotive vehicle which is constructed with the body frame of this invention;

Figure 2 is a perspective view of the frame;

Figure 3 is a fragmentary transverse sectional view taken on line 3—3 of Figure 1; and Figure 4 is a detailed sectional view taken through the front edge of the roof on the line 4—4 of Figure 1.

With more particular reference to the accompanying drawings, the body 12 of the illustrated automotive vehicle 10 is mounted on a frame 14, which is designed and constructed to eliminate the columns or posts conventionally utilized to support the front portion of the roof panel 16 and which is braced and supported in a manner to strengthen the roof.

The body frame 14 includes a roof skeleton or frame which is formed from a U-shaped steel beam 20, the bight portion 22 and adjoining sections 24 and 26 of the parallel legs 28 and 30 being supported in a horizontal plane above the chassis 32 at a height varied in accordance with the preferred design of the body. Transversely aligned posts or columns 34 and 36 are welded or otherwise rigidly secured at their lower ends to the longitudinal channel bars 38 and 40 of the chassis and support the beam 20 at their upper ends, which are welded to the underside of the leg sections 24 and 26. In conformance with the present design of inwardly inclined upper side portions, the posts are offset at their upper ends and are positioned at the rear of the front doors or between the front and rear doors.

The outer ends 42 and 44 of the legs are inclined downwardly and are welded to the rearward ends of the chassis bars 38 and 40, the ends of the legs forming a rearward support for the roof frame and the posts 34 and 36 forming a forward support at the center of the chassis.

Crossed diagonal bars 46 and 48 are arched and are welded at their forward ends to the horizontally disposed bight section 22 to rigidify the beam 20 and a bowed brace bar 50 is transversely fixed between the inclined ends 42 and 44 of the legs of the beam, with the rearward ends of the bars 46 and 48 being welded to the opposing ends thereof.

The roof section 16 is conventionally mounted on the roof skeleton and a transversely curved windshield 54 is supported at its upper edge in an inclined plane by the bight portion 22 of the skeleton or frame, with the lower edge thereof conventionally mounted on the cowl 64. A weather strip device, such as the resilient channel strip 56, supports the upper edge of the windshield and is attached to the bight portion 22.

The front doors 58 of the body are conventionally formed with vertically adjustable windows 60 and ventilator panels 62 separated by mullions from the windows and adjustable about a vertical axis to open and closed positions. The forward vertical edges 66 of the ventilator panels are adapted to mate with the rearwardly directed end edges 68 of the windshield with a resilient fitting or strip 70, or other conventional weather strip device, being interposed between the adjoining edges to form a weather seal and prevent seepage of water.

As seen in Figures 1 and 3, the weather strip 70 is of a slight width so that the terminal edges 68 of the windshield are arced rearward and are aligned longitudinally with the closed panels and the view is uninterrupted by conventional posts or columns. Also, as depicted in Figure 2, the roof frame or skeleton is braced in an inexpensive manner by the welded brace bars and is supported on the chassis in a manner to avoid interferences with other body features and to strengthen the roof panel.

Thus, the frame not only permits the mounting of a windshield in a manner to increase the driver's area of visibility, but also adds a definite safety factor, since the frame will withstand severe strains and forces, such as caused by overturning of the vehicle.

Having thus described the invention, what is claimed is:

1. In an automotive vehicle body having a wheel mounted chassis and transversely aligned doors on opposite sides of the body, a body frame including transversely aligned posts mounted vertically on opposite sides of the chassis rearwardly of the doors, and an integral U-shaped beam secured to the upper ends of said posts and having the bight and a portion of the legs horizontally disposed in spaced relation above and transversely overlying the chassis forwardly of the center thereof, said bight and horizontal portions of said legs being unsupported forwardly of said posts, the free ends of the legs being inclined downwardly rearwardly of said posts and secured at opposite sides of the rearward end of the chassis.

2. In an automotive vehicle body having a wheel mounted chassis and transversely aligned doors on opposite sides of the body, a body frame including transversely aligned posts mounted vertically on opposite sides of the chassis rearwardly of the doors, an integral U-shaped beam secured to the upper ends of said posts and having the bight and a portion of the legs horizontally disposed in spaced relation above and transversely overlying the chassis forwardly of the center thereof, said bight and horizontal portions of said legs being unsupported forwardly of said posts, the free ends of the legs being inclined downwardly rearwardly of said posts and secured on opposite sides of the rearward end of the chassis, a bowed brace arm extending between and secured to the legs of said beam rearwardly of said posts, and a pair of brace arms arranged in arched diagonally crossed relation between said legs and secured thereto.

JACKIE L. THOMPSON.

REFERENCES CITED

The following references are of record in the file of this patent:

UNITED STATES PATENTS

| Number | Name | Date |
|---|---|---|
| 1,523,636 | Dunn | Jan. 10, 1925 |
| 1,631,046 | McCullough | May 31, 1927 |
| 1,715,402 | Woodward | June 4, 1929 |
| 1,828,743 | Lovell | Oct. 27, 1931 |
| 2,043,756 | Lalancette | June 9, 1936 |
| 2,208,204 | Vigroux | July 16, 1940 |
| 2,389,907 | Helmuth | Nov. 27, 1945 |
| 2,437,664 | Hicks | Mar. 9, 1948 |
| 2,580,156 | Brown | Dec. 25, 1951 |

FOREIGN PATENTS

| Number | Country | Date |
|---|---|---|
| 510,945 | Great Britain | Aug. 10, 1939 |
| 527,067 | Great Britain | Oct. 1, 1940 |